Figure 1:
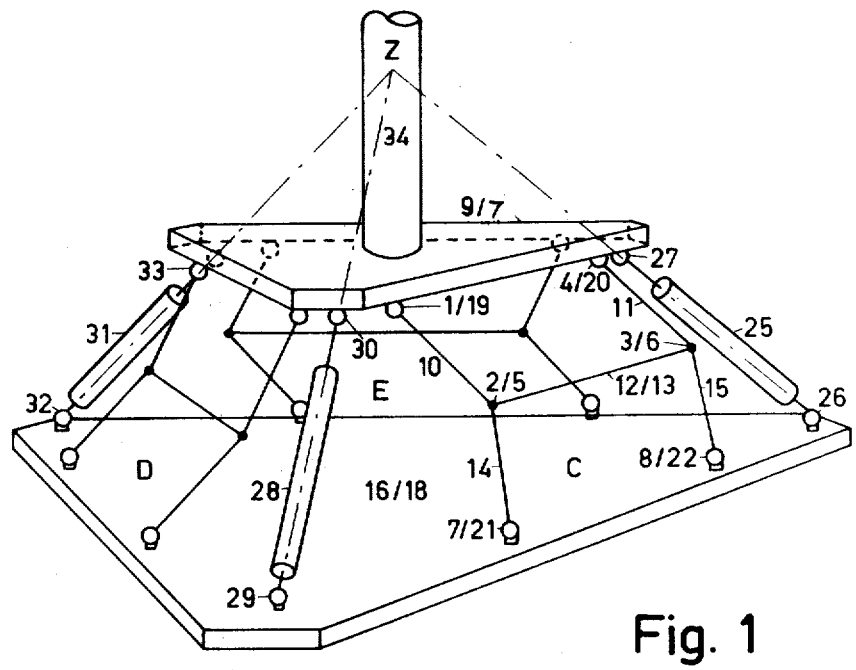

United States Patent [19]
Schulte et al.

[11] 3,871,778
[45] Mar. 18, 1975

[54] MECHANISM FOR COUPLING TWO OBJECTS

[75] Inventors: Anthonius Maria Schulte, Delden; Uilko Van Der Wal, Hengelo, both of Netherlands

[73] Assignee: N. V. Hollandse Signaalapperten, Hengelo (O), Netherlands

[22] Filed: Feb. 9, 1971

[21] Appl. No.: 113,977

[30] Foreign Application Priority Data
Feb. 11, 1970   Netherlands...................... 7001896

[52] U.S. Cl.................... 403/52, 248/163, 403/410
[51] Int. Cl. ............................................ F16c 11/00
[58] Field of Search ........ 287/1; 248/186, 346, 180, 248/163; 74/99 R, 89; 403/52

[56] References Cited
UNITED STATES PATENTS

| | | | |
|---|---|---|---|
| 2,901,208 | 8/1959 | Jones................................ | 248/346 |
| 2,921,764 | 1/1960 | Cairnes........................... | 248/346 X |
| 3,159,968 | 12/1964 | Welles ............................ | 248/163 X |
| 3,201,894 | 8/1965 | Resch .............................. | 248/346 X |
| 3,229,941 | 1/1966 | Suliteanu et al.................. | 248/163 |
| 3,288,421 | 11/1966 | Peterson ......................... | 248/179 X |
| 3,419,238 | 12/1968 | Flory................................ | 248/20 X |

FOREIGN PATENTS OR APPLICATIONS
999,010   7/1965   Great Britain

*Primary Examiner*—Andrew V. Kundrat
*Attorney, Agent, or Firm*—Frank R. Trifari

[57] ABSTRACT

The mechanism permits mutual translational movements but prevents mutual rotation of the objects. It couples the objects by elastic means and by means of at least three coupling devices, each device consists of two systems each comprising four parts linked to form a closed loop by means of hinged joints. In each system the joints form the vertexes of a parallelogram. One of the systems in a device can rotate, as one unit, relative to one of the objects around an axis. The second system can rotate, as one unit, either relative to the other object or to the first mentioned system. The mechanism is suitable for supporting vulnerable apparatus for measuring angular coordinates in space on a support that is subjected to shocks and vibrations (such as on a ship) the transmission of which is substantially suppressed, allowing undisturbed measurement of the coordinates with respect to said support.

6 Claims, 12 Drawing Figures

PATENTED MAR 18 1975

3,871,778

SHEET 1 OF 3

INVENTORS

ANTHONIUS MARIA SCHUELTE
UILKO VAN DER WAL

BY Frank R. [signature]

AGENT

INVENTORS
ANTHONIUS MARIA SCHUETE
UILKO VAN DER WAL

BY

AGENT

MECHANISM FOR COUPLING TWO OBJECTS

The invention relates to a mechanism for coupling two objects, and in particular to such a mechanism which contains at least one elastic device to effect such coupling.

It is the object of the present invention to produuce such a mechanism which permits relative translational movement of the coupled objects but prevents relative rotational movement of these objects about any axis.

According to the present invention, the mechanism is arranged so that the objects are connected by at least three coupling devices each of which comprises two systems.

Each system has parts linked by four hinges so as to form a closed loop. Because of the hinge movement and the distance between the hinges joined to the same part, the hinges remain located at the vertices of a parallelogram. In each of the two systems of each coupling device, the opposite parts can swing relative to the object which is coupled at the same side of that system. Further, the two systems in each of the coupling devices are connected to each other at the sides facing away from the objects to be coupled. One of the two systems of a coupling device can swing, as one unit, relative to the adjoining object about an axis, hereinafter called the first axis, whose direction is substantially different from the direction of the axes about which the parts of the respective system can rotate. The other system of the respective coupling device can swing, either relative to the adjoining object or relative to the aforementioned system of said coupling device, about another axis, hereinafter called the second axis, which is maintained parallel to the first axis through the operation of at least one of the two systems of the respective coupling device. Also, with the use of three coupling devices, the three planes, as determined by the first axis and the corresponding second axis of a coupling device, pass through a common finite point and intersect one another in pairs in three lines, no two of these lines being either coincident or parallel.

A mechanism according to the invention can be successfully used to couple an apparatus or instrument to a support which may be subjected to heavy shocks and/or vibrations so as to prevent damage while still maintaining angular position of the apparatus or instrument with respect to the support. The apparatus or instrument is allowed to perform translational movement in arbitrary directions with respect to the support so that inertial forces will not affect the apparatus or instrument.

Nevertheless a coupling mechanism according to the invention prevents any mutual rotation of the coupled objects around at least three axes no two of which are either parallel or coincident.

The mechanism according to the invention is especially suitable for connecting a pedestal for carrying an apparatus for measuring angular coordinates in space (such as a theodolite or a radar aerial) to a support fixed to a ship or a vehicle that may be subjected to shocks and vibrations. Although the mechanism substantially suppresses the transmission of shocks and vibrations to the apparatus, the apparatus supported by it will nevertheless measure the angular coordinates with respect to the support (ship or vehicle).

Play and torsion in the coupling devices of the mechanism may result in small mutual rotational movement of the coupled objects. The extent of said motion depends to a certain extent on the mutual positions of the axes around which the coupling devices oppose said motion. The most favorable situation is obtained when, in the quiescent state of the mechanism, the three planes mentioned above are mutually perpendicular or almost perpendicular to each other.

As a rule the most effective mechanism will be obtained if the parts in each of the two systems facing away from the adjoining object are rigidly attached to each other and each of these systems can swing as one unit relative to the adjoining object about an axis. Various methods can be applied to enable said systems to effect such swinging movements.

In one such method, at least one of the systems of one coupling device can swing relative to the adjoining object through the direct connection of two oppositely situated parts of this system. These parts extend from said object to the other system of the same coupling device, to said object by means of universal joints.

In another method, at least one of the systems of one coupling device can swing relative to the adjoining object. The part of this system which adjoins said object, also can swing relative to said object about an axis whose direction substantially differs from that of the parallel axes about which in said system, two oppositely situated parts extending to the other system of the same coupling device can swing relatively to said part.

It is not necessary that the two systems in the same coupling device be connected in the same way to the two objects, nor is it necessary for the connections between said objects and the systems of the various coupling devices of the same mechanism be effected in the same way. It would be possible to connect one system of a coupling device to an object by means of universal joints and to connect the other system of the same coupling device to an object by means of normal hinges fixed to a part of said system. Further it would be possible to connect the two systems in one of the coupling devices to the objects by means of universal joints. In another coupling device of the same mechanism the systems are connected to the objects by means of hinges.

If insufficient room is available or in order to adapt the shape of certain coupling arrangements to the shape of other parts it may be desirable to build a mechanism in such a way that one of the two systems in each of the coupling devices is able to rotate as a single unit around a first axis relative to the object directly connected thereto, and also relative to the other system around a second axis, the axes being parallel, while the second system cannot swing as a whole unit relative to the object directly connected thereto, only two elements thereof, stretching between the last mentioned object and the first system, being able to rotate with respect to the last mentioned object around parallel axes.

Figure 2:
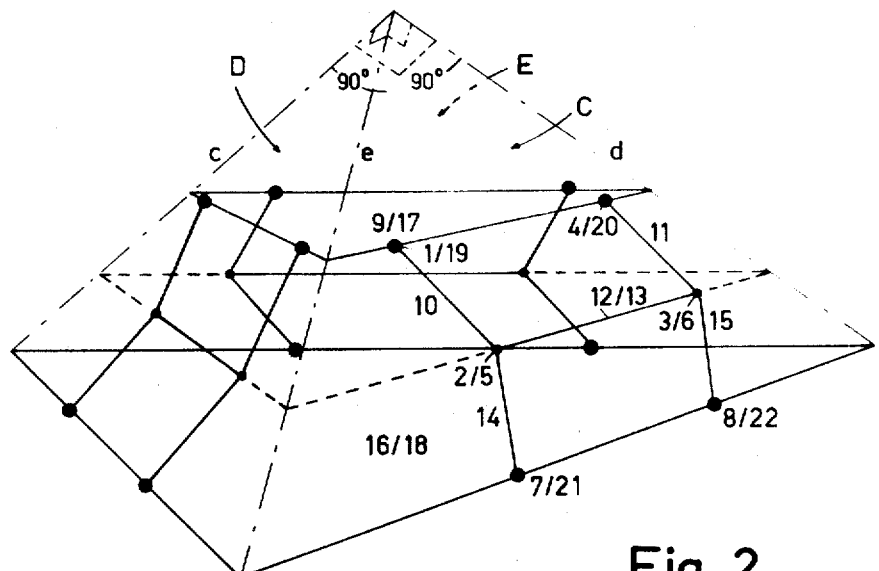

The invention will now be described with reference to the accompanying drawings showing various embodiments of mechanisms according to the invention in which FIG. 1 is a perspective view showing a complete mechanism according to the invention;

FIG. 2 is a schematic representation of the situation of the coupling devices in the embodiment acccording to FIG. 1; and FIG. 3a–d and FIG. 4a–f show 10 different embodiments of coupling devices that can be applied in mechanisms according to the invention.

In the figures, like components are denoted by like reference numerals. It was therefore necessary to denote, in some figures, certain components by combined numerals, as the function of each of these components is performed by two components in other figures. For example, in FIG. 1 the hinge's pin 2/5 performs the functions of the hinge's pins 2 and 5 in FIG. 3a.

The embodiment of a mechanism according to the invention shown in FIG. 1 will be described first. This mechanism is fitted with coupling devices of the type shown in FIG. 3a. The mechanism joins a base plate 16/18 mounted on a vehicle or ship to a supporting plate 9/17 on which a supporting column 34 is mounted which carries an apparatus that can be directed into space, such as a theodolite. This apparatus is not shown in the drawing. The two plates are connected by means of three elastic devices 25, 28 and 31. Such an elastic device may comprise a cylindrical housing that is connected to the base plate 16/18 by means of a universal joint, such as a ball and socket joint, 26, 29, 32. At the opposite side of the housing a bar can slide longitudinally in guides in the housing and the part of the bar that protrudes from the housing is connected to the supporting plate 9/17 by means of a universal joint such as ball and socket 27, 30, 33. Cylindrical helical springs in the housing tend to keep the bar in a midway position but forces exerted between the universal joints will cause the bar to shift longitudinally against the forces exerted on it by the springs. The commmplete mechanism is arranged in such a way that in its midway state, due to the influence of the elastic devices and the three coupling devices, to be described hereinafter, each of the lines passing through the center of rotation of the universal joints belonging to the same elastic device, also passes through or, nearly through the centre of gravity Z of the combination consisting of the supporting plate 9/17, the column 34 and the measuring apparatus carried thereby. In such a situation there is less likely to be any exertion of torques on said combination.

The elastic devices are not the only connections between the base plate and the supporting plate; these plates are also joined by means of three coupling devices. The coupling device which can swing relative to the coupled objects about axes lying in the plane C will be described in greater detail. This coupling device comprises a bar 12/13 which carries near its ends at 2/5 and 3/6 parallel pins which are perpendicular to the longitudinal axis of the bar. Two arms can swing about each of said pins. An arm 10, which is attached to the universal joint 1/19, such as a ball and socket joint, to the supporting plate 9/17 by universal joint 1/19, is rotatable around the axis 2/5. A second arm 14 is also rotatable around pin 2/5 and is connected by means of a universal joint 7/21 to the base plate 16/18. In a similar way two arms can swing around the pin 3/6, i.e., the arm 11 connected by means of a universal joint 4/20 to the supporting plate 9/17 and the arm 15 connected by means of a universal joint 8/22 to the base plate 16/18. The lengths of these arms are such that the distance between the pin 2/5 and the center of rotation of the universal joint 1/19 is the same as the distance between the pin 3/6 and the center of rotation of the universal joint 4/20. Also the distance between the pin 2/5 and the centre of rotation of the universal joint 7/21 is equal to that between the pin 3/6 and the centre of rotation of the universal joint 8/22. Further, the distance between the centres of rotation of the universal joints 1/19 and 4/20 as well as the distance between the centers of rotation of the universal joints 7/21 and 8/22 are equal to the distance between the pins 2/5 and 3/6. If the part of the base plate situated between the universal joints 7/21 and 8/22, and the part of the supporting plate 9/17 situated between the universal joints 1/19 and 4/20 are considered as parts of the coupling device, then, in view of the equal distances mentioned above, this coupling device comprises two systems each consisting of four parts which are linked by hinged joints to form a closed loop in which the joints lie on the vertexes of a parallelogram. Consequently the straight line through the center of rotation of the universal joints 1/19 and 4/20 is always kept parallel to the straight line joining the centers of rotation of the universal joints 7/21 and 8/22 by the coupling device. A plane C passes through these lines and the coupling device prevents mutual rotations of the coupled objects, i.e., the base plate 16/18 as well as the supporting plate 9/17 with the parts mounted on said plate, around an axis that is perpendicular to said plane C.

In addition to the coupling device already described, the mechanism shown in FIG. 1 has two other, similar coupling device, i.e., one that keeps two axes situated in the plane D mutually parallel and one that keeps two axes situated in the plane E mutually parallel. These coupling devices prevent mutual rotation of the base plate 16/18 and supporting plate 9/17 around axes that are perpendicular to the planes D and E. The three coupling devices are so mounted that where the mechanism is in the quiescent state, the planes C, D, and E 1. pass through or nearly through the center of gravity Z of the combination of supporting plate 9/17 supporting column 34, and any apparatus mounted thereon;
2. constitute three pairs of at least nearly perpendicular planes.

Under these circumstances the coupling devices prevent mutual rotations of base plate 16/18 and supporting plate 9/17 around three axes no two of which are either parallel or coincident. This means that any mutual rotation of the coupled parts is prevented. Actually in the mechanism described with reference to FIG. 1 the three axes around which no mutual rotation is possible, when the mechanism is in the quiescent state, are nearly perpendicular to each other. Maximum suppression of any mutual rotation is thus most effectively achieved.

The relative positions of the parts in the mechanism can be seen more clearly from FIG. 2 which schematically shows the mechanism. Base and supporting plate 16/18 and 9/17 are shown as open triangles so that no parts of the coupling devices are concealed by these plates.

Universal joints are shown as large dots and joints operating as normal hinges are shown as small dots. The three planes C, D and E each containing a pair of axes kept parallel to each other by means of a coupling device, are also visible. These planes form a three-sided pyramid, of which the planes C, D and E are pairwise mutually perpendicular. Furthermore, these planes pass through or nearly through the center of gravity Z of the combination consisting of the supporting plate, the column and the supported instrument.

The coupling devices will not prevent mutual translational motions of the coupled objects, for the mechanism not only permits translational movements of the parallel axes in the planes in which they are situated, but also swinging motions of the coupling devices with respect to the base plate and the supporting plate; these coupling devices are attached to said plates by means of universal joints, such as ball and socket joints. During such swinging motions said axes also remain parallel.

In various embodiments of mechanisms according to the invention ball bearings are used as universal joints and this is highly recommendable because excellent ball bearings with spherical ball races and very small play can be obtained at low prices.

However, it is possible to avoid the use of universal joints in the coupling devices. A coupling device will now be described with reference to FIG. 3b in which only normal "hinges" are used, i.e., hinges which permit rotation of the joined parts around one axis only.

Figure 3A:
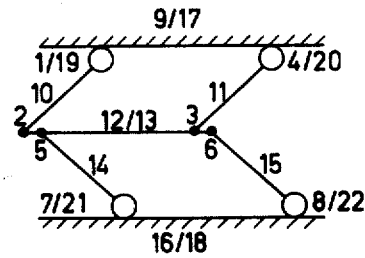
Figure 3B:
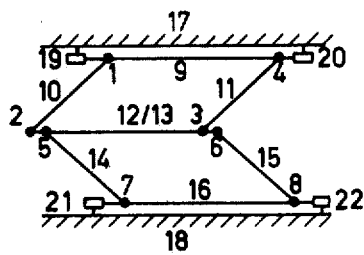

As in the coupling device already described, the device shown in FIG. 3b, comprises a central bar 12/13 which is a part of each of the two systems (common to both parallelograms) in the device. This bar carries four parallel pins 2, 3, 5 and 6, the axes of which are perpendicular to the bar 12/13. A bar 10 is mounted so as to be able to rotate around the pin 2 and it can also rotate around the pin 1 carried by the bar 9. A bar 11 can rotate around the pin 3, and also around the pin 4 carried by the bar 9. The four bars coupled in this way form one of the two systems of the coupling device. The lengths of these bars between the various pins are such, that these pins form the vertexes of a parallelogram, so that bars 9 and 12/13 remain parallel. In a similar way the bar 12/13 is connected by means of the bars 14 and 15 to the bar 16. Consequently the coupling device keeps the bar 16 parallel to the bar 9. The bar 9 is connected to the object 17 by means of hinges 19 and 20 connected to said object. Similarly the bar 16 is connected to the second other object 18 by means of the hinges 21 and 22 so that the coupling device can rotate relative to the object 18 around an axis that is determined by said two hinges. The coupling device keeps the axis, determined by the hinges 19, 20, parallel to the axis determined by the hinges 21, 22.

The coupling device shown in FIG. 3b differs in two ways from the device described with reference to FIG. 1; it uses no universal joints and the bars situated at one end of the central bar 12/13 rotate around different pins, while the corresponding bars in the arrangement shown in FIG. 1 rotate around the same pins. It is obvious that on the one hand, the coupling device shown in FIG. 1 can be built in such a way that the bars situated at one end of the bar 12/13 can rotate around different pins — see FIG. 3a which shows an embodiment of such a coupling device while on the other hand, the device according to FIG. 3b may be built in such a way, that at least one pair of bars situated at one end of the bar 12/13 — e.g. the bars 10 and 14 — can rotate by the same pin.

Figure 3C:
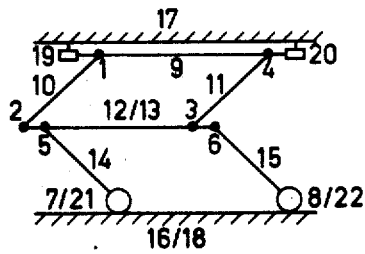

Also the coupling device can be so constructed that in one of its systems universal joints are used as shown in FIG. 1 for the coupling of one of the objects, while the other system uses normal hinges, as shown for the hinged connection with the other object. FIG. 3c shows such a coupling device. Description in greater detail of this device is not necessary.

Figure 3D:
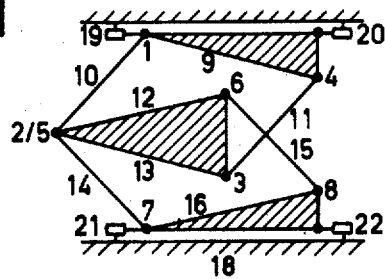

It is important that none of the angles in the parallelograms become too acute. If such acute angles should occur, even slight play in the joints and hinges would lead to considerable rotations of the coupled objects. FIG. 3d shows an embodiment of a coupling device in which, as a rule, such acute angles can be avoided. In order to avoid such acute angles the direction of the bar 12 of one system in the coupling device is different from that of the bar 13 belonging to the other system of the same device. These bars are arranged so as to form an angle such that the smaller angles in the parallelograms are increased. The figure shows a symmetrical embodiment in which the angle between the bar 9 and the axis determined by the hinges 19 and 20 is equal to the angle between the bar 16 and the axis defined by the hinges 21 and 22. Such symmetry is, however, by no means necessary; the angles mentioned above need not be equal, it is even possible that in one of the two systems such a bar (e.g. the bar 9 in the upper system) has the same direction as the axis around which the coupling device can swing with respect to the object situated at that side. In this case the coupling of the object on that side can even be established by means of universal joints or ball and socket joints. In such an embodiment the angle between the side of the other system nearest the adjoining object and the axis about which said system can swing, as one unit, relative to said object, must usually be greater, but this will not be a disadvantage.

Up till now it has been assumed that the two systems of a coupling device are parallel to one and the same plane, but this is not necessary. It may even be desirable, (for instance, in order to save space by adapting the shape of a coupling device to the presence of certain objects,) for them to be parallel to different and intersecting planes.

Further, it is not necessary for the axes determined by the hinges in FIG. 3b to have the same direction as or to coincide with the bars 9 and 16. The direction of these axes may differ from that of said bars and the angle of difference may be in the plane formed by these axes as well as in the plane perpendicular thereto, provided that these axes remain parallel and are kept parallel by the coupling device. In the embodiment according to FIG. 3b these axes might be at an angle to the plane of the drawing.

In the embodiments described up till now each of the systems in a coupling device are capable of swinging as one unit relative to the object coupled thereto, but the systems are not arranged to be able to swing as one unit relative to each other. However, in certain cases it is possible and advantageous to build the coupling device in such a way that only one of its system can swing as one unit, relative to the other system of said device about another axis which is kept parallel to the first axis by means of the first system. The second system is, however, not able to swing as one unit relative to the adjoining object, only two oppositely situated parts of said second system, stretching from the object connected to said second system to the first system can swing with respect to said object around parallel axes.

Figure 4A:
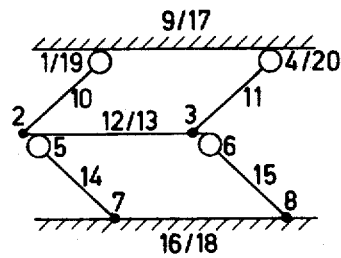

FIG. 4a shows an emmbodiment of such a coupling device. The upper system of this device is built in the same way as the upper system in the device shown in FIG. 3a, but in the lower system the bars 14 and 15 between the object 16/18 and the upper system are coupled to said object so as to be able to swing around parallel axes 7 and 8 bars 14 and 15 being attached to the bar 12/13, which is common to both systems, by means of universal joints 5 and 6. Because both systems form parallelograms mutual rotation of the coupled objects around an axis which is perpendicular to the plane through the axes around which the upper system can swing with respect to the object connected to it and to the lower system (the axis through the centres of rotation of the universal joints 1/19 and 4/20 and the axis through the centres of rotation of the universal joints 5 and 6) is prevented. Mutual translational movements of the coupled objects are, however, possible as a result of changes in the shape of the parallelograms of the systems and to the swinging motions of the upper system relative to the adjoining object 9/17 about an axis passing through the centers of rotation of the universal joints 1/19 and 4/20 and also relative to the lower system around an axis through the centers of rotation of the universal joints 5 and 6.

Figure 4D:
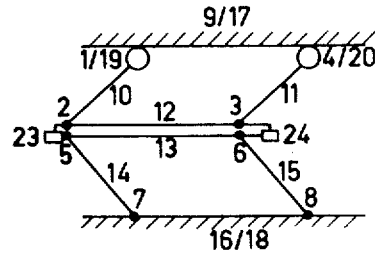
Figure 4B:
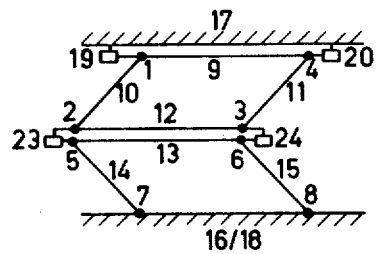

FIG. 4b shows a similar coupling device that has no universal joints. The upper system consists of the bars 9, 10, 11 and 12 capable of swinging around parallel axes 1, 2, 3 and 4. This system can swing as one unit relative to the object 17, because the bar 9 can rotate by the hinges 19 and 20 mounted to said object. The lower system consists of the bars 13, 14, 15 and the part 16 of the object 18. These bars form a parallelogram and can swing with respect to each other around parallel axes 5, 6, 7 and 8 two of which, i.e., 7 and 8, are rigidly attached to the object 18. Consequently, the lower system cannot swing as one unit relative to the adjoining object 18. The bar 12 of the upper system can, however, rotate relative to the bar 13 of the lower system by means of the hinges 23 and 24 hence, the upper system can rotate as one unit, relative to the lower system around the axis determined by these hinges, said axis being kept parallel to the axis determined by the hinges 19 and 20 by means of the upper system. The upper system can therefore swing as one unit similar to the upper system in the coupling device shown in FIG. 4a and, consequently, permits the same relative translational motions of the coupled objects as the device shown in FIG. 4a.

It will be shown that it is possible to build coupling devices of this type which use hinges permitting rotation around a fixed axis in the way shown in FIG. 4b, as well as universal joints in the way shown in FIG. 4a. FIG. 4c shows a coupling device in which the upper system is arranged so as to be able to swing as one unit, relative to the object 17 directly coupled to this system by means of hinges permitting rotation around a fixed axis in the way shown in FIG. 4b, while the lower system is coupled to the upper one in the way shown in FIG. 4a by means of universal joints. FIG. 4d, shows a coupling device in which the upper system is connected to the object 9/17 by means of universal joints which permit it to swing as one unit relative to said object, while the upper system can swing as one unit relative to the lower system because these systems are connected by means of hinges 23 and 24 permitting mutual rotation around a predetermined fixed axis.

Figure 4E:
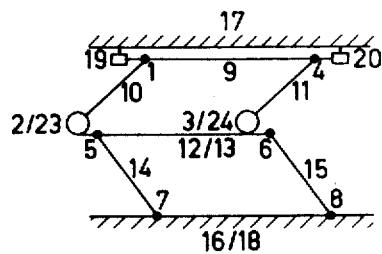
Figure 4C:
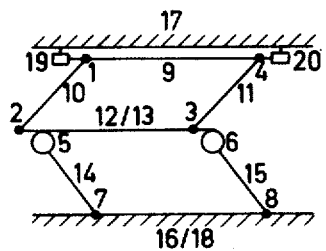

FIG. 4e shows a coupling device in which the hinges that permit the upper system to swing as one unit relative to the adjoining object 17 and also relative to the lower system, all form part of the upper system. The bar 9 in this upper system can rotate relative to the object 17 by hinges permitting rotation around one single fixed axis. Bars 10 and 11 can rotate near one of their ends with respect to the bar 9 around parallel pins 1 and 4 mounted to said bar 9. The other ends of these bars 10 and 11 are attached to the bar 12/13 which forms part of both the upper and the lower system by means of universal joints, such as ball and socket joints 2/23 and 3/24. The joints 3/24 and 2/23 permit changes in the shape of the parallelograms which constitute the upper system and also permit swinging motions of the upper system relative to the lower system around an axis passing through the centres of rotation of said universal joints. Bars 14, 15 rotate relative to object 18 around parallel pins 7, 8.

Figure 4F:
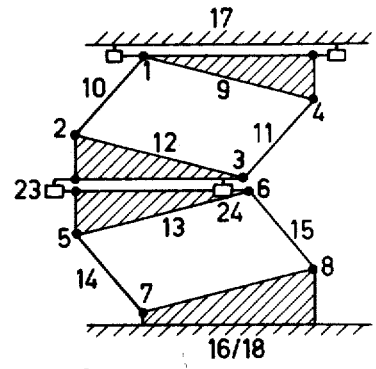

It is to be noted that the maximum number of universal joints in a system is two, because otherwise such a system would no longer be able to keep two axes parallel. In coupling devices in which the two systems are capable of swinging, as an entire unit, relative to each other, it is possible to avoid the occurrence of angles which are too acute in the system by changing the direction of the parts of the systems in the way shown in FIG. 3d. A coupling device arranged to avoid such acute angles is shown in FIG. 4f. This coupling device need not be further described. Also in this embodiment it is not necessary for bars with corresponding portions in the two systems to be at the same angles relative to the axes around which the systems can swing as one unit. This may lead to constructions in which universal joints can be used. If, for instance, the bar 13 coincides with the axis around which the two systems can swing as one unit relative to each other the joints formed by pins 23 and 5 may be combined to one universal joint and the same applies to the joints formed by pins 6 and 24.

It is possible to build the mechanism with more than three elastic devices and it is also possible to use elactic devices that can exert forces, the directions of which differ from the direction of the lines joining the points at which such devices are coupled to the two objects.

Further, it is not necessary that the forces exerted by the elastic devices pass through or nearly through the center of gravity of one of the coupled objects when the mechanism is in the quiescent state, and it is not even necessary that these forces pass through the same point during this quiescent state. Nevertheless, embodiments in which the lines of these forces do not pass through the same point and, especially, do not pass through said center of gravity, are disadvantages, as this will give rise to torques between the coupled objects. Although these torques, as a result of the presence of the coupling devices, will not lead to mutual rotation of the objects, they will nevertheless consstitute an unnecessary load on the coupling devices.

As may be derived from FIG. 1 the forces exerted by the elastic devices, even in the quiescent state of the mechanism need not coincide or nearly coincide with the intersecting line of the planes which, in each of the coupling devices, pass through the two axes about which the systems can swing.

Further, even in the quiescent state of the mechanism, said planes need not be mutually perpendicular or nearly perpendicular. Also, even in the quiescent state of the mechanism, it is not necessary that said planes pass or nearly pass through the center of gravity of one of the two coupled objects.

The parallel axes around which certain parts (such as bars) of a system can swing with respect to other parts (such as bars) of this system need not be perpendicular to such parts or, more specifically, to the lines joining the positions of the two axes of the same parts.

A mechanism similar to that, according to the invention, may be constructed with more than three coupling devices and in this case it is not necessary that even in the quiescent state of the mechanism the planes, which in each coupling device pass through the axes around which the systems of such a device can swing to pass through the same point.

It may be desirable to damp the movements of the coupled objects with respect to each other. Damping devices for this purpose may be combined with each of the elastic devices, for instance, more or less in the same way in which, shock absorbers of a motor vehicle in are combined with the springs.

What we claim is:

1. A mechanism for coupling two objects comprising at least one elastic element connected between said objects, a plurality of coupling devices connected between said objects, each of said coupling devices comprising two linkage systems connected to each other at sides thereof remote from the objects coupled by said coupling devices, each system comprising linkage elements connected by four hinges so as to form a closed parallelogram loop, said hinges being located at the vertices of said parallelogram, opposite linkage elements of each of said systems arranged for rotational movement relative to the object their respective system is directly coupled to about the hinges of their system, means connecting one of said systems of each coupling device to one of said objects so as to permit rotational movement of said system as an entire unit about a first axis and relative to said object connected thereto, the direction of said first axis being different from the direction of the axes about which said linkage elements can rotate, and means for connecting said other system of said coupling device to the other of said objects and to said first system so that said other system is capable of rotational movement about a second axis parallel to said first axis relative to said other object connected thereto or relative to said first system, wherein three of said coupling devices are provided between said objects, each of said coupling devices lying in a plane containing said first and second axes, said planes passing through a common point and intersecting each other forming three lines none of which are parallel or coincident.

2. The mechanism according to claim 1 wherein the three planes are mutually perpendicular to each other when the mechanism is in a quiescent state.

3. The mechanism according to claim 1, wherein the three planes pass through the center of gravity of one of the coupled objects.

4. The mechanism according to claim 1 wherein a plurality of elastic devices couple the two objects, and wherein the forces exerted by said elastic devices pass through the same point during the quiescent state of the mechanism.

5. The mechanism according to claim 1 wherein a plurality of elastic devices couple the two objects, and wherein, during the quiescent state of the mechanism, the forces exerted by at least three of said devices pass through the point of intersection of the three planes.

6. The mechanism according to claim 5 wherein the point of intersection coincides with the center of gravity of one of the objects.

* * * * *